(12) United States Patent
Liu et al.

(10) Patent No.: US 12,501,450 B2
(45) Date of Patent: Dec. 16, 2025

(54) SIDELINK TRANSMISSION METHOD, SIDELINK TRANSMISSION APPARATUS, AND TERMINAL

(71) Applicant: VIVO MOBILE COMMUNICATION CO., LTD., Dongguan (CN)

(72) Inventors: Siqi Liu, Dongguan (CN); Zichao Ji, Dongguan (CN); Huan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 331 days.

(21) Appl. No.: 18/092,200

(22) Filed: Dec. 30, 2022

(65) Prior Publication Data

US 2023/0134982 A1    May 4, 2023

Related U.S. Application Data

(63) Continuation of application No. PCT/CN2021/104303, filed on Jul. 2, 2021.

(30) Foreign Application Priority Data

Jul. 3, 2020 (CN) .......................... 202010637406.6

(51) Int. Cl.
*H04L 1/18* (2023.01)
*H04L 1/1812* (2023.01)
(Continued)

(52) U.S. Cl.
CPC ........... *H04W 72/25* (2023.01); *H04L 1/1812* (2013.01); *H04W 72/40* (2023.01)

(58) Field of Classification Search
CPC ... H04L 1/1812; H04L 1/1854; H04L 1/1887; H04L 1/1896; H04L 5/0053; H04L 5/0094; H04W 72/25; H04W 72/40
See application file for complete search history.

(56) References Cited

U.S. PATENT DOCUMENTS 12,095,566 B2 *  9/2024  Hwang ................. H04L 1/1812
12,150,115 B2 * 11/2024  Zhao ...................... H04W 72/40
(Continued)

FOREIGN PATENT DOCUMENTS

CN    110876202 A    3/2020
CN    110972297 A    4/2020
(Continued)

OTHER PUBLICATIONS

International Search Report issued in corresponding International Application No. PCT/CN2021/104303, mailed Aug. 27, 2021, 4 pages.
(Continued)

*Primary Examiner* — Phuc H Tran
(74) *Attorney, Agent, or Firm* — IPX PLLC

(57) ABSTRACT

A sidelink transmission method and a terminal are provided. The sidelink transmission method includes: determining indication information in sidelink control signaling; and performing transmission based on the indication information. The indication information in the sidelink control signaling is determined based on indication information in sidelink resource control signaling, or the indication information in the sidelink control signaling indicates one transmission resource in a target transmission resource. The target transmission resource is provided by the sidelink resource control signaling.

20 Claims, 10 Drawing Sheets

(51) Int. Cl.
*H04W 72/25* (2023.01)
*H04W 72/40* (2023.01)

(56) References Cited

U.S. PATENT DOCUMENTS

| | | | | |
|---|---|---|---|---|
| 2020/0205165 | A1* | 6/2020 | Huang | H04L 5/0051 |
| 2020/0205166 | A1 | 6/2020 | Huang et al. | |
| 2021/0266110 | A1* | 8/2021 | Wang | H04W 72/0446 |
| 2021/0400681 | A1* | 12/2021 | Wang | H04L 5/0053 |
| 2023/0127485 | A1* | 4/2023 | Sun | H04L 5/0053 |
| | | | | 370/329 |

FOREIGN PATENT DOCUMENTS

| | | |
|---|---|---|
| CN | 111083784 A | 4/2020 |
| CN | 111149401 A | 5/2020 |
| CN | 111294167 A | 6/2020 |

OTHER PUBLICATIONS

Huawei et al., "Discussion on HARQ support for NR sidelink", 3GPP TSG-RAN WG2 #106, R2-1907414, May 2019, 6 pages.
First Office Action issued in related Chinese Application No. 202010637406.6, mailed May 30, 2022, 9 pages.
Intel Corporation, "Network controlled sidelink resource allocation design for NR V2X communication", 3GPP TSG RAN WG1 Meeting #96bis, R1-1904295, Apr. 2019, 8 pages.
Extended European Search Report issued in related European Application No. 21833969.5, mailed Nov. 20, 2023, 7 pages.
LG Electronics: "Discussion on physical layer procedures for NR sidelink", 3GPP Draft; R1-2003566, May 2020, 22 pages.
Second Office Action issued in related Chinese Application No. 202010637406.6, mailed Jan. 4, 2023, 8 pages.
Third Office Action issued in related Chinese Application No. 202010637406.6, mailed May 16, 2023, 6 pages.
Office Action issued in related European Application No. 21833969.5, mailed Sep. 16, 2025, 6 pages.
"3rd Generation Partnership Project; Technical Specification Group Radio Access Network; NR; Physical layer procedures for data (Release 16)", 3GPP Standard; Technical Specification; 3GPP TS 38.214, vol. RAN WG1, No. V16.1.0 Apr. 3, 2020 (Apr. 3, 2020), pp. 1-151, XP051893823.
"3rd Generation Partnership Project; Technical Specification Group Radio Access Network; NR; Multiplexing and channel coding (Release 16)", 3GPP Standard; Technical Specification; 3GPP TS 38.212, vol. RAN WG1, No. V16.1.0 Apr. 3, 2020 (Apr. 3, 2020), pp. 1-146, XP051893819.

* cited by examiner

SIDELINK TRANSMISSION METHOD, SIDELINK TRANSMISSION APPARATUS, AND TERMINAL

CROSS-REFERENCE TO RELATED APPLICATIONS

This application is a continuation of International Application No. PCT/CN2021/104303, filed on Jul. 2, 2021, which claims priority to Chinese Patent Application No. 202010637406.6 filed on Jul. 3, 2020. The entire contents of each of the above-referenced applications are expressly incorporated herein by reference.

TECHNICAL FIELD

This application relates to the field of wireless communication technologies, and specifically, to a sidelink transmission method, a sidelink transmission apparatus, and a terminal.

BACKGROUND

In a Sidelink (SL) system, a Transmitter (TX UE) transmits sidelink control signaling to a Receiver (RX UE) to indicate an SL transmission method, for example, indicating content such as transmission resources for sidelink transmission and a Hybrid Automatic Repeat Request (HARQ) feedback scheme, so as to ensure that RX UE and TX UE have a consistent understanding of the SL transmission method, thus ensuring reliability, resource utilization, and the like of sidelink transmission.

In addition, a control node may configure and provide SL resources by using SL Downlink Control Information (DCI) or SL Configured Grant (SL CG), and a scheduled terminal can perform transmission on the SL resources. To ensure that the control node and the terminal have a consistent understanding of the usage and state of SL resources so as to reduce scheduling errors and interference, it is necessary to determine how an SL transmission method is determined according to sidelink resource control signaling.

SUMMARY

Embodiments of this application are intended to provide a sidelink transmission method, a sidelink transmission apparatus, and a communications device.

This application is implemented as follows.

According to a first aspect, a sidelink transmission method applied to a terminal is provided. The method includes:

determining indication information in sidelink control signaling; and performing transmission based on the indication information; where the indication information in the sidelink control signaling is determined based on indication information in sidelink resource control signaling, and/or the indication information in the sidelink control signaling indicates one transmission resource in a target transmission resource, where the target transmission resource is provided by the sidelink resource control signaling.

According to a second aspect, a sidelink transmission apparatus is provided and includes:

a determining module, configured to determine indication information in sidelink control signaling, where the indication information in the sidelink control signaling is determined based on indication information in sidelink resource control signaling, and/or the indication information in the sidelink control signaling indicates one transmission resource in a target transmission resource, where the target transmission resource is provided by the sidelink resource control signaling; and a transmission module, configured to perform transmission based on the indication information.

According to a third aspect, a terminal is provided. The terminal includes a processor, a memory, and a program or instructions stored in the memory and capable of running on the processor. When the program or instructions are executed by the processor, the steps of the method according to the first aspect are implemented.

According to a fourth aspect, a readable storage medium is provided. The readable storage medium stores a program or instructions, and when the program or instructions are executed by a processor, the steps of the method according to the first aspect or the steps of the method according to the third aspect are implemented.

According to a fifth aspect, a chip is provided. The chip includes a processor and a communications interface. The communications interface is coupled to the processor, and the processor is configured to run a program or instructions on a network-side device so as to implement the method according to the first aspect.

In the embodiments of this application, a method for determining indication information in sidelink control signaling is defined, ensuring that RX UE, TX UE, and a control node have a consistent understanding of the SL transmission method, thus guaranteeing reliability and resource utilization of sidelink transmission and reducing scheduling errors and interference.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "/" generally indicates that the associated objects have an "or" relationship.

It is worth noting that the technology described in the embodiments of this application is not limited to Long Term Evolution (LTE)/LTE-Advanced (LTE-A) systems, but may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, the New Radio (NR) system is described for illustration purposes, and NR terms are used in most of the following descriptions, although these technologies may also be applied to other applications than the NR system application, for example, $6^{th}$ Generation (6G) communications systems.

Figure 1:
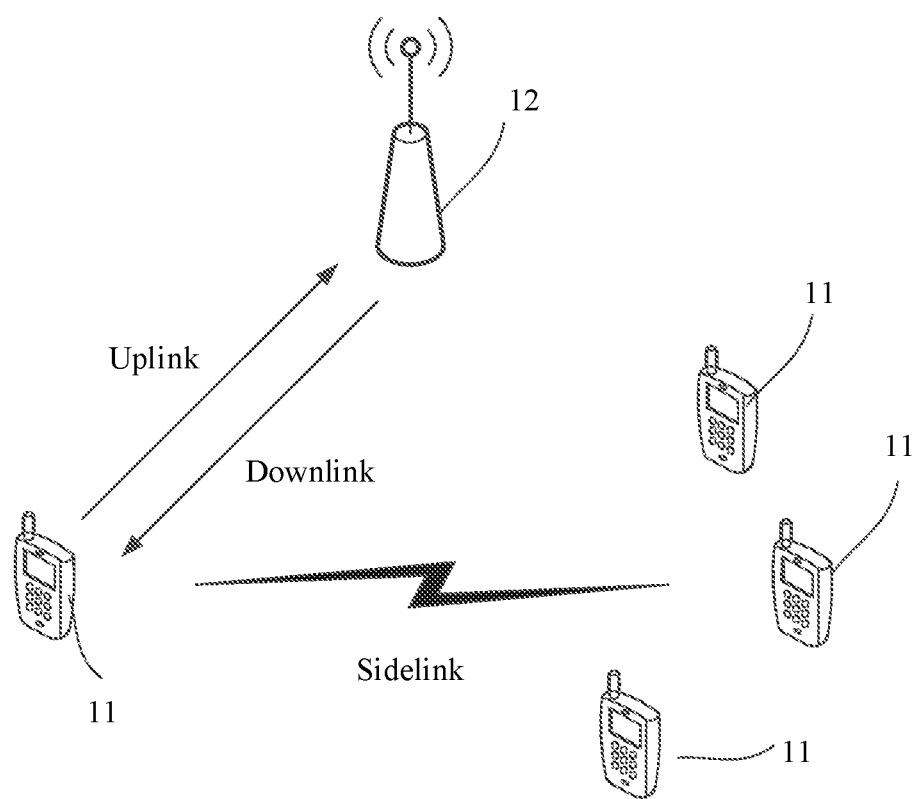
FIG. 1 is a block diagram of a wireless communications system to which the embodiments of this application are applicable.

FIG. 1 is a block diagram of a wireless communications system to which the embodiments of this application are appliable. The wireless communications system includes a terminal 11 and a network-side device 12. The terminal 11 may also be referred to as a terminal device or User Equipment (UE). The terminal 11 may be a terminal-side device such as a mobile phone, a tablet personal computer, a laptop computer or notebook computer, a Personal Digital Assistant (PDA), a handheld computer, a netbook, an Ultra-Mobile Personal Computer (UMPC), a Mobile Internet Device (MID), a wearable device, a Vehicular User Equipment (VUE), or a Pedestrian User Equipment (PUE). The wearable device includes a bracelet, a headphone, glasses, and the like. It should be noted that the terminal 11 is not limited to any specific type in the embodiments of this application. The network-side device 12 may be a base station or a core network. The base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a WLAN access point, a Wi-Fi node, a Transmitting Receiving Point (TRP), or some other appropriate terms in the art. The base station is not limited to a specific technical term as long as the same technical effects are achieved. It should be noted that the base station in the NR system is taken merely as an example in the embodiments of this application, but the base station is not limited to any specific type.

Related communication terms in the embodiments of this application are described below.

1. Sidelink HARQ Feedback

To improve reliability and effectiveness of sidelink transmission, sidelink HARQ is introduced to NR Vehicle to Networking (V2X). On sidelink, a transmit terminal (TX UE) transmits data/Transport Blocks (TBs) to a receive terminal (RX UE), and the receive terminal determines whether data reception is successful. In a case that the reception is successful, the receive terminal feeds back an ACK to the transmit terminal; otherwise, the receive terminal feeds back a NACK.

Sidelink supports unicast, groupcast, and broadcast transmission, where both unicast transmission and groupcast transmission require support for HARQ feedback. For unicast transmission, RX UE feeds back ACK/NACK on its Physical Sidelink Feedback Channel (PSFCH) resource. For groupcast transmission, there are at least two feedback forms: (1) RX UEs share PSFCH resources and feed back only NACK, where in the case of successful TB demodulation, RX UEs do not give any feedback; and (2) RX UEs occupy different PSFCH resources and feed back ACK/NACK on their respective resources.

The TB transmission occurs on a Physical Sidelink Shared Channel (PSSCH) resource, and the ACK/NACK transmission occurs on a corresponding PSFCH resource.

2. Sidelink Physical Sidelink Control Channel (PSCCH)/PSSCH Retransmission Scheme Sidelink supports two PSSCH retransmission schemes. One is HARQ feedback based retransmission and the other is blind retransmission. In a case that TX UE uses the HARQ feedback based transmission or retransmission, RX UE needs to perform HARQ feedback for a PSSCH transmitted by TX UE, and TX UE determines whether to retransmit the PSSCH according to the HARQ feedback; and in a case that TX UE uses the blind retransmission scheme, TX UE directly performs PSSCH transmission on a retransmission resource, without relying on HARQ feedback.

For multiple transmission resources for one TB, blind retransmission and HARQ feedback based transmission or retransmission separately performed on different transmission resources are not supported. For example, a user has obtained two transmission resources and is intending to use them for retransmission of a given TB. Then, these two transmission resources are either both for blind retransmission or both for HARQ feedback based transmission or retransmission. For transmission of one TB, in a case that HARQ feedback corresponding to an initial transmission or a retransmission of the TB is ACK or that the user determines that the transmission is successful, the user releases other transmission resources reserved for that TB.

3. Sidelink Resource Selection

Sidelink supports at least two resource allocation modes: mode 1 and mode 2. For mode 1, a control node allocates transmission resources to TX UE; and for mode 2, TX UE autonomously selects transmission resources.

At least for mode 2, to ensure that PSSCH retransmission resources are present after TX UE demodulates feedback information, a time gap between PSSCH transmission resources selected for any two transmissions needs to be greater than HARQ RTT.

The HARQ RTT time Z equals a+b, where a is a time gap between the end of the last symbol of the 1st PSSCH transmission and the beginning of the 1st symbol of a corresponding PSFCH reception, and a is determined by a resource pool configuration and higher layer parameters of MinTimeGapPSFCH and period-PSFCHresource; and b is a time required for PSFCH reception and retransmission preparation, including multiplexing of necessary physical channels and any TX-RX/RX-TX switching time, and b is determined by UE.

Figure 2:
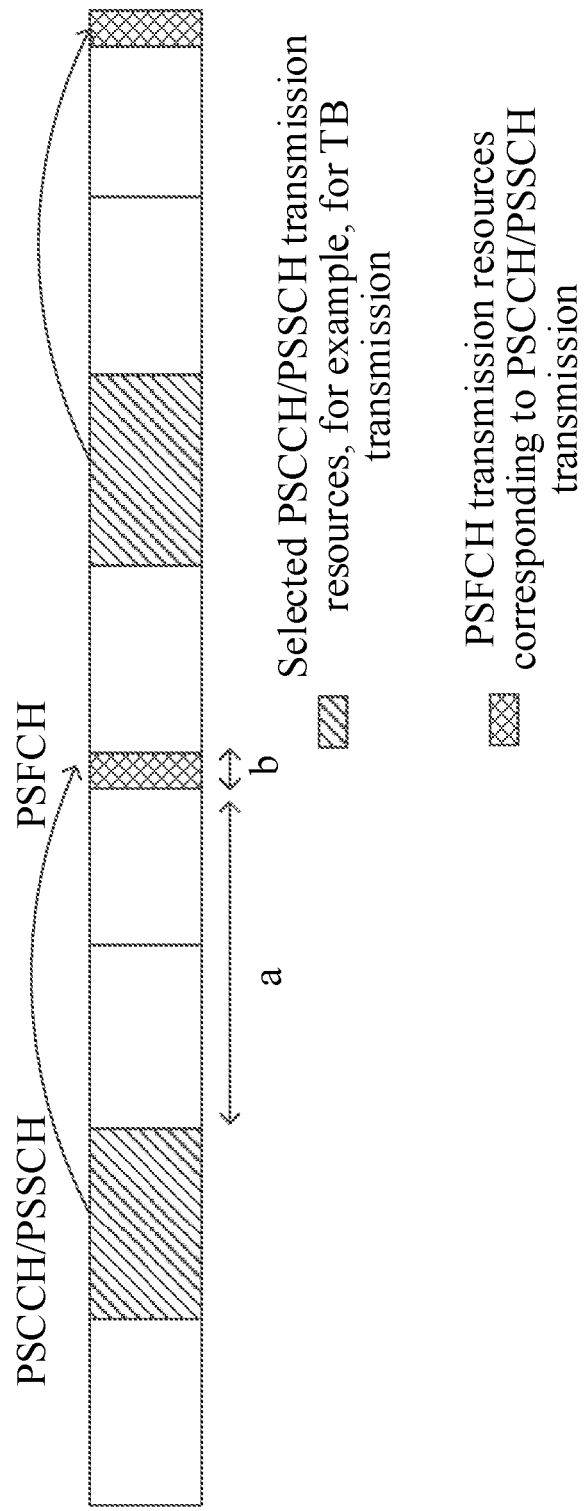
FIG. 2 and FIG. 3 are schematic diagrams of determining a and b of HARQ Round Trip Time (RTT)
Figure 3:
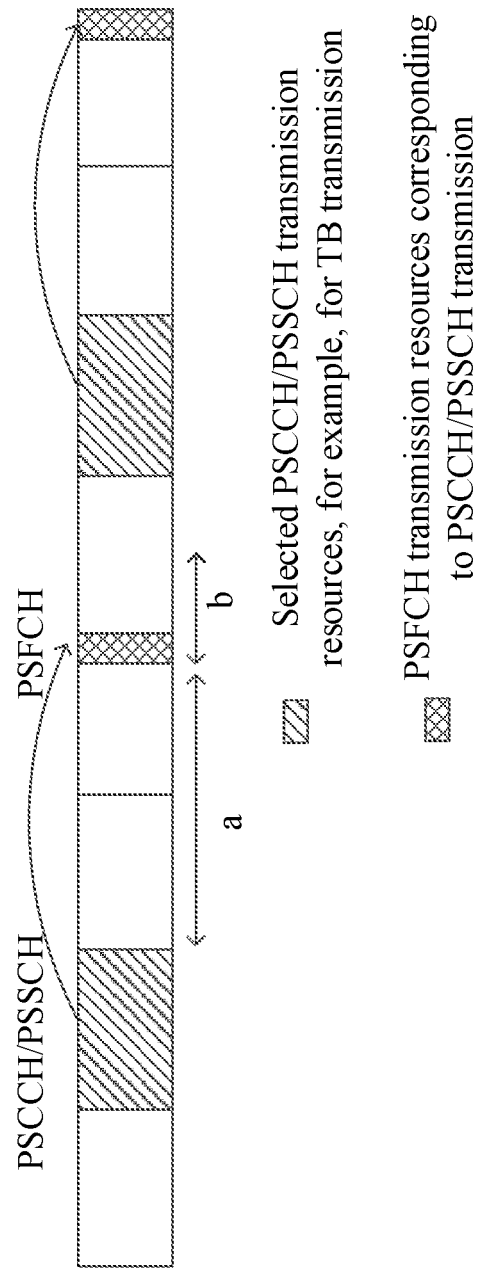

Refer to FIG. 2 and FIG. 3. FIG. 2 and FIG. 3 are schematic diagrams of determining a and b of HARQ RTT. In FIG. 2, b has a smaller value, and PSFCH reception and retransmission preparation can be completed within a slot in which the PSFCH is located. In FIG. 3, b has a larger value, and PSFCH reception and retransmission preparation need to span slots.

4. Sidelink Resource Reservation

TX UE makes resource reservation from resources allocated to it. The reservation includes periodic reservation and aperiodic reservation, and the reserved resources are used for subsequent PSSCH and/or PSCCH transmission. The reservation period may be indicated in sidelink control information, and the sidelink control information may be at least one of Sidelink Control Information (SCI), SFCI, SL MAC CE, PC5-RRC, and other sidelink channels or signals.

Figure 4:
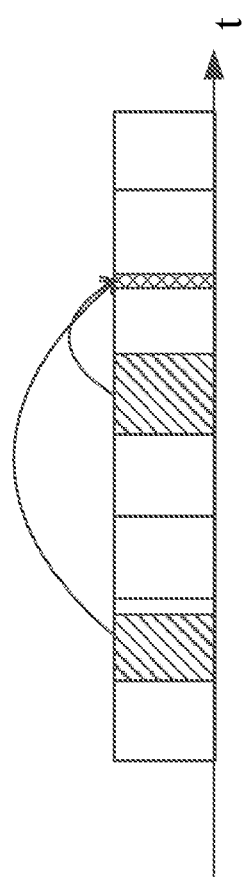
FIG. 4 and FIG. 5 are schematic diagrams illustrating that transmission resources provided by a control node for two adjacent transmissions do not meet HARQ RTT.
Figure 5:
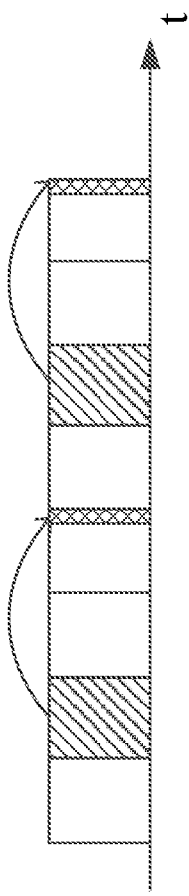

When a user obtains resources from a control node (for example, the control node allocates or indicates or recommends resources for the user, typically, for example, in the case of mode 1), transmission resources (for example, PSSCH and/or PSCCH resources) provided by the control node for two successive transmissions may not meet HARQ RTT, as shown in FIG. 4 and FIG. 5. For the case in FIG. 4, two adjacent transmission resources (corresponding to one TB) correspond to one PSFCH occasion. For the case in FIG. 5, although two adjacent transmission resources (corresponding to one TB) correspond to different PSFCH occasions, TX UE has to spend a long time processing a previous transmission resource and/or its corresponding PSFCH, and when a next PSSCH transmission resource arrives, TX UE is unable to get ready for a PSSCH retransmission. FIG. 4 shows a regular situation but does not exclude the possibility of the case shown in FIG. 5.

The following describes in detail the sidelink transmission method, sidelink transmission apparatus, and terminal provided in the embodiments of this application through some embodiments and application scenarios thereof with reference to the accompanying drawings.

Figure 6:
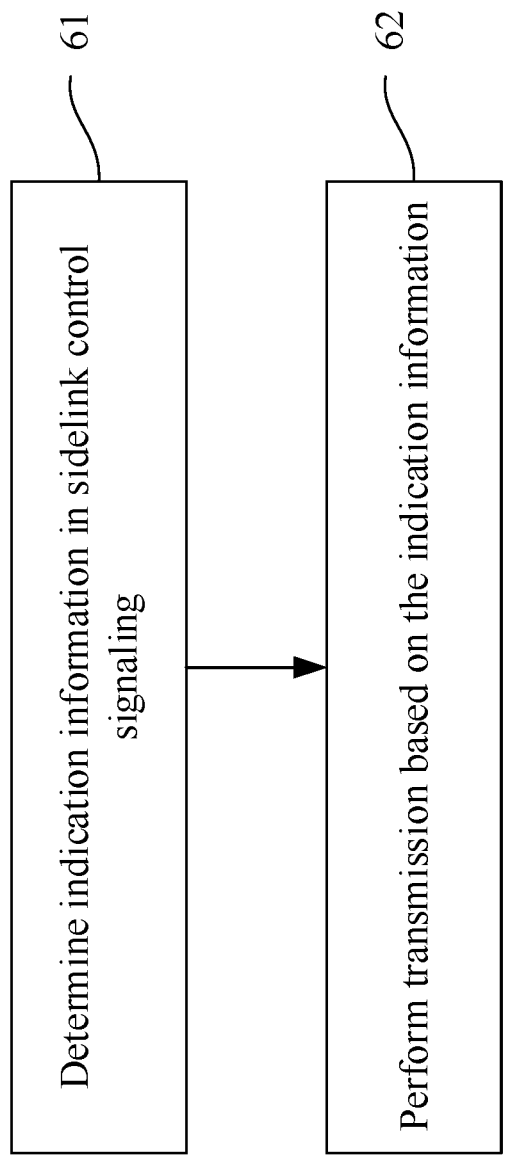
FIG. 6 is a schematic flowchart of a sidelink transmission method according to an embodiment of this application.

Refer to FIG. 6. An embodiment of this application provides a sidelink transmission method, applied to a communications device and including the following steps.

Step 61: Determine indication information in sidelink control signaling.

In an embodiment of this application, for example, the sidelink control signaling is Sidelink Control Information (SCI).

In the foregoing embodiment of this application, for example, the SCI is 1st-stage SCI, such as SCI format 1-A.

Step 62: Perform transmission based on the indication information.

The indication information in sidelink control signaling is determined based on indication information in sidelink resource control signaling, and/or the indication information in sidelink control signaling indicates one transmission resource in a target transmission resource, where the target transmission resource is provided by the sidelink resource control signaling.

In this embodiment of this application, a method for determining indication information in sidelink control signaling is defined, ensuring that RX UE, TX UE, and a control node have a consistent understanding of the SL transmission method, thus guaranteeing reliability and resource utilization of sidelink transmission and reducing scheduling errors and interference.

In an embodiment of this application, for example, before the determining indication information in sidelink control signaling, the method further includes: obtaining a target transmission resource from the control node.

In an embodiment of this application, the target transmission resource includes one or more transmission resources.

In some embodiments, the target transmission resource is all transmission resources provided by the sidelink resource control signaling.

In an embodiment of this application, for example, the target transmission resource includes at least one of the following types.

1. Transmission Resource(s) for One TB or Medium Access Control Protocol Data Unit (MAC PDU)
   (11) for example, transmission resource(s) for one TB or MAC PDU as indicated by one or more SL DCI; and
   (12) for example, transmission resource(s) for one TB or MAC PDU as indicated by one or more SL DCIs and/or SL CGs.

The SL DCI is DCI for scheduling or activating or deactivating an SL resource, for example, DCI scrambled by SL-RNTI or SL-CS-RNTI, for example, DCI format 3-0.

In an embodiment of this application, transmission resources for one TB or MAC PDU may be resources that are probably used for transmitting the TB or MAC PDU (meaning that some transmission resources are probably not used for the TB or MAC PDU), or may be resources actually used for transmitting the TB or MAC PDU.

The sidelink configured grant may be at least one of SL CG type 1, SL CG type 2, and SL Semi-Persistent Scheduling (SPS).

2. Transmission Resource(s) Indicated by Dynamic Control Signaling
   (21) for example, transmission resource(s) indicated by one SL DCI; and
   (22) for example, dynamic resource(s) scheduled or indicated or recommended by a control node or another terminal.

3. Transmission Resource(s) Indicated by Semi-Persistent Control Signaling
   (31) for example, transmission resource(s) in each period as indicated by sidelink configured grant; and
   (32) for example, semi-persistent resource(s) scheduled or indicated or recommended by a control node or another terminal.

Dynamic resources may be interpreted as aperiodic resources.

The dynamic control signaling may be dynamic sidelink control signaling. The semi-persistent control signaling may be semi-persistent sidelink control signaling.

In an embodiment of this application, the sidelink resource control signaling includes at least one of the following:

sidelink DCI, SL DCI for short, for example, DCI format 3-0;

SL CG;

Media Access Control Control Element (MAC CE);

Radio Resource Control (RRC) signaling; and pre-defined sidelink signal or channel, for example, SCI, SCI format, Sidelink Feedback Control Channel (SFCI), PSFCH, PSSCH, PSCCH, Physical Sidelink Discovery Channel (PSDCH), or other sidelink signals or channels.

In some embodiments, when the control node is a user, it may use MAC CE or RRC or a pre-defined sidelink signal or channel to indicate or schedule or recommend resources for other users.

The control node in the above sidelink system may be, for example, a network-side device (for example, base station), a Road Side Unit (RSU), a headend user terminal, a user terminal with a scheduling capability, or a user terminal (for example, receiver) capable of recommending or indicating transmission resources.

In an embodiment of this application, for example, the indication information in the sidelink control signaling and/or sidelink resource control signaling includes at least one of the following:
  resource indication information;
  HARQ enable/disable indication information;
  reservation period indication information; and
  PSFCH indication information.

The methods for determining various indication information in sidelink control signaling are described below.

(I) Method for Determining Resource Indication Information in Sidelink Control Signaling 1. The indication information in the sidelink control signaling is determined based on indication information in sidelink resource control signaling.

In some embodiments of this application, for example, that the indication information in the sidelink control signaling is determined based on indication information in sidelink resource control signaling includes:
  resource indication information in the sidelink control signaling indicates the same transmission resource as the resource indication information in the sidelink resource control signaling, for example, resource indication information in SCI indicates the same content or resource as resource indication information in SL SCI.

In some embodiments, the resource indication information in the sidelink control signaling indicates a current transmission resource and a transmission resource following the current transmission resource.

The current transmission resource may also be described as a transmission resource that the sidelink control signaling is located on (or schedules), or a transmission resource on which the data scheduled or indicated by the sidelink control signaling is located, or a transmission resource on which the sidelink control signaling and the data scheduled or indicated by the sidelink control signaling are located.

In an embodiment of this application, the current transmission resource may be indicated by directly or indirectly indicating N=1, where N is the number of transmission resources indicated. For example, time domain resource indication information (for example, Time Resource Indicator Value (TRIV)) in the SCI is set to 0, indicating that N=1. For example, setting the TRIV in the SCI to 0 means that the SCI indicates a current transmission resource.

The transmission resource may be a PSCCH and/or PSSCH resource.

The current transmission resource and the transmission resource following the current transmission resource are both transmission resources within the same target transmission resource.

For example, the SL CG includes transmission resources 1, 2, and 3, and the resource indication information in the SCIs on the transmission resources 1, 2 and 3 indicates transmission resources 1, 2, and 3, transmission resources 2 and 3, and transmission resource 3 respectively.

In some embodiments, a total number of current transmission resources and transmission resources following the current transmission resources as indicated by the resource indication information in the sidelink control signaling does not exceed a preset threshold.

For example, the preset threshold is Nmax=2, the SL CG includes transmission resources 1, 2, and 3, and the resource indication information in the SCIs on transmission resources 1, 2, and 3 indicates transmission resources 1 and 2, transmission resources 2 and 3, and transmission resource 3 respectively.

As another example, the total number of current transmission resources and transmission resources following the current transmission resources as indicated by the resource indication information in the sidelink control signaling does not exceed a smaller one of a first value and the preset threshold, where the first value is a total number of transmission resources inclusive of the current transmission resources and available transmission resources following the current transmission resources.

In some embodiments, the indication information in the sidelink control signaling indicates one transmission resource in a target transmission resource.

That the indication information in the sidelink control signaling indicates one transmission resource in the target transmission resource means that the resource indication information in the sidelink control signaling indicates one transmission resource in the target transmission resource.

2. The resource indication information in the sidelink control signaling indicates one transmission resource in the target transmission resource.

In some embodiments of this application, the resource indication information in the sidelink control signaling indicates one transmission resource in the target transmission resource, and the resource indication information in the sidelink control signaling is independent of the resource indication information in the sidelink resource control signaling.

The following describes a case that the resource indication information in the sidelink control signaling indicates one transmission resource in the target transmission resource as in the foregoing Embodiments 1 and 2.

In Embodiments 1 and 2, for example, that the indication information in the sidelink control signaling indicates one transmission resource in a target transmission resource includes: when two transmission resources or two transmission resource bundles in the target transmission resource meet a target gap requirement or two transmission resources or two transmission resource bundles in the target transmission resource do not meet a target gap requirement, the indication information in the sidelink control signaling indicates one transmission resource in the target transmission resource.

In Embodiments 1 and 2, for example, that the indication information in the sidelink control signaling indicates one transmission resource in a target transmission resource includes: when two transmission resources or two transmission resource bundles in the target transmission resource do not meet a target gap requirement, the indication information in the sidelink control signaling indicates one transmission resource in the target transmission resource.

Figure 7:
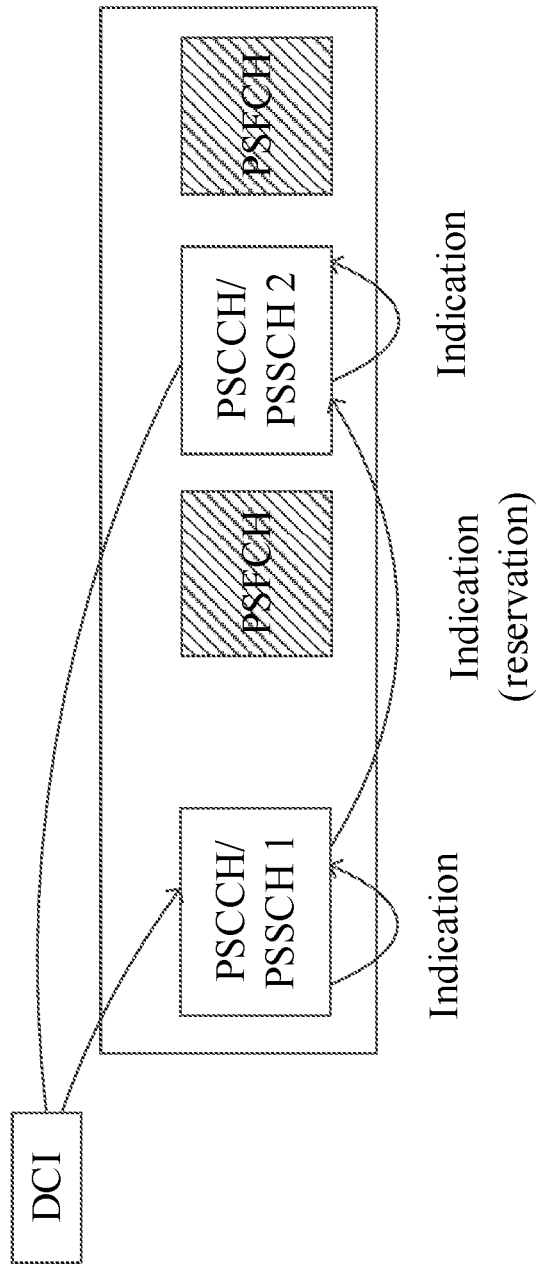
FIG. 7 shows a method for indicating related side link control signaling.
Figure 8:
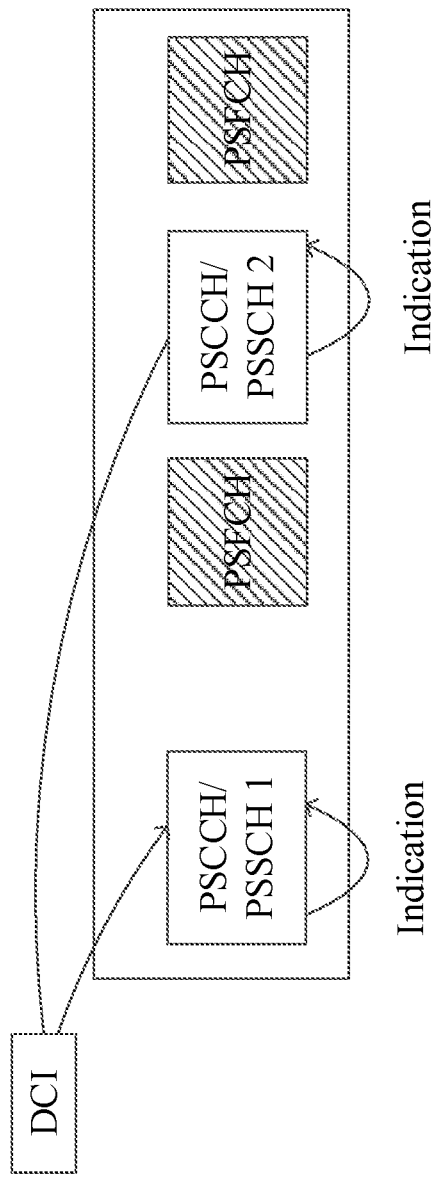
FIG. 8 shows a method for indicating sidelink control signaling according to an embodiment of this application.

Refer to FIG. 7 and FIG. 8. In FIG. 7, the sidelink Resource Control Signaling (DCI) provides two transmission resources, where the 1st transmission resource indicates itself and the 2nd transmission resource. In this case, in a case that the 1st transmission resource and the 2nd transmission resource do not meet the target gap requirement, when the 2nd PSSCH transmission resource arrives, readiness for PSSCH retransmission cannot be achieved. However, in an embodiment of this application, as shown in FIG. 8, in a case that two transmission resources or two transmission resource bundles in the target transmission resource do not meet the target gap requirement, the 1st transmission resource and the 2nd transmission resource both indicate themselves. Thus, each transmission indicates only the current transmission resource, without any resource reserved. Therefore, there is no need considering whether the next resource and the current resource meet the target gap requirement.

The meaning of two transmission resources or two transmission resource bundles is described below.

In an embodiment of this application, for example, the two transmission resources are two transmission resources in the target transmission resource; the two transmission resource bundles are two transmission resource bundles in the target transmission resource.

In an embodiment of this application, for example, the two transmission resources are two adjacent transmission resources in the target transmission resource, or any two transmission resources in the target transmission resource, or two pre-determined transmission resources in the target transmission resource. The two pre-determined transmission resources may be the earliest two transmission resources or the latest two transmission resources in the target transmission resource, or two transmission resources corresponding to preset numbers or positions.

The two transmission resource bundles are two adjacent transmission resource bundles in the target transmission resource, or any two transmission resource bundles in the target transmission resource, or two transmission resource bundles pre-determined in the target transmission resource. The two pre-determined transmission resource bundles may be the earliest two transmission resource bundles or the latest two transmission resource bundles in the target transmission resource, or two transmission resource bundles corresponding to preset numbers or positions. The gap between two adjacent transmission resources or transmission resource bundles in the target transmission resource meeting or not meeting the target gap requirement can be understood in this way: a gap between every two adjacent transmission resources or transmission resource bundles in the target transmission resource meets or does not meet the target gap requirement, or at least two adjacent transmission resources or transmission resource bundles in the target transmission resource have a gap meeting or not meeting the target gap requirement.

The gap between any two transmission resources or transmission resource bundles in the target transmission resource meeting or not meeting the target gap requirement can be understood in this way: a gap between every two transmission resources or transmission resource bundles in the target transmission resource meets or does not meet the target gap requirement, or at least two adjacent transmission resources or transmission resource bundles in the target transmission resource have a gap meeting or not meeting the target gap requirement.

The meaning of transmission resource bundle is described below.

In an embodiment of this application, for example, transmission resources provided by one piece of SL resource control signaling (for example, one SL DCI or one SL CG) are treated as one transmission resource bundle, and each transmission resource in the transmission resource bundle is treated as one SL grant, for example, transmission resources within the transmission resource bundle are independent of each other.

In an embodiment of this application, for example, that two transmission resource bundles meet the target gap requirement includes: the I-th transmission resource in one of the two transmission resource bundles and the J-th transmission resource in the other transmission resource bundle meet the target gap requirement, where I and J are positive integers.

In an embodiment of this application, for example, the 1st transmission resource in one of the two transmission resource bundles and the 1st transmission resource in the other transmission resource bundle meet the target gap requirement, meaning that I and J are both 1.

In an embodiment of this application, for example, the number of transmission resources in one of the two transmission resource bundles is I, and the number of transmission resources in the other transmission resource bundle is J, and the last (that is, the I-th) transmission resource in the one of the two transmission resource bundles and the last (that is, the J-th) transmission resource in the other transmission resource bundle meet the target gap requirement.

In an embodiment of this application, for example, the 1st (that is, I=1) transmission resource in one (which is assumed to be transmission resource bundle 1) of the two transmission resource bundles and the last transmission resource (that is, the J-th, where the number of transmission resources in the other transmission resource bundle is J) in the other transmission resource bundle (which is assumed to be transmission resource bundle 2) meet the target gap requirement. In some embodiments, in this case, the 1st transmission resource of transmission resource bundle 1 follows the last transmission resource bundle of transmission resource bundle 2.

In an embodiment of this application, for example, I=J.

In an embodiment of this application, for example, the two transmission resource bundles are transmission resource bundles for transmission of one TB.

In an embodiment of this application, for example, the two transmission resource bundles are transmission resource bundles with the same HARQ process ID for the same sidelink configured grant; or the two transmission resource bundles are transmission resource bundles of two adjacent periods for the same sidelink configured grant.

In the embodiments of this application, an advantage of setting transmission resource bundles lies in that there is no need considering whether multiple transmission resources in one SL DCI or one SL CG need to meet the target gap requirement or whether blind retransmission and HARQ feedback based transmission or retransmission are mixed.

The gap between two adjacent transmission resources or transmission resource bundles in the target transmission resource meeting or not meeting the target gap requirement can be understood in this way: a gap between every two adjacent transmission resources or transmission resource bundles in the target transmission resource meets or does not meet the target gap requirement, or at least two adjacent transmission resources or transmission resource bundles in the target transmission resource have a gap meeting or not meeting the target gap requirement.

The gap between the any two transmission resources or transmission resource bundles in the target transmission resource meeting or not meeting the target gap requirement can be understood in this way: a gap between every two transmission resources or transmission resource bundles in the target transmission resource meets or does not meet the target gap requirement, or at least two adjacent transmission resources or transmission resource bundles in the target transmission resource have a gap meeting or not meeting the target gap requirement.

In an embodiment of this application, for example, the meeting the target gap requirement includes one of the following:
being greater than or equal to a+b;
being greater than or equal to a+b+c;
being greater than or equal to a+b+c+d; where
a is a time between the 1st data transmission on the two transmission resources or two transmission resource bundles and a corresponding PSFCH;
b is a time required for PSFCH reception and retransmission preparation;
c is a time required for processing PUCCH or PUSCH transmission; and
d is a time required for processing PDCCH.

Here, a+b is the HARQ RTT described in the preceding content.

In some embodiments, a is the minimum time gap requirement between the end of the last symbol of the 1st data transmission on the two transmission resources or transmission resource bundles and the beginning of the 1st symbol of the corresponding PSFCH reception.

In some embodiments, b is the minimum time gap requirement for PSFCH reception and retransmission preparation.

In some embodiments, c is the minimum time gap requirement for processing PUCCH or PUSCH transmission.

In some embodiments, d is the minimum time gap requirement for processing PDCCH, including the minimum time gap requirement for PDCCH decoding and/or the minimum time gap requirement for PDCCH scheduling data.

In some embodiments, the minimum time gap requirement may be understood as a processing time requirement.

The gap between two transmission resources or two transmission resource bundles not meeting a target gap requirement may also be described in this way: a gap between two transmission resources or two transmission resource bundles in the target transmission resource does not meet the target gap requirement, or a gap between two adjacent transmission resources or two adjacent transmission resource bundles in the target transmission resource does not meet the target gap requirement, or a gap between any two transmission resources or any two transmission resource bundles in the target transmission resource does not meet the target gap requirement, or a gap between at least part of transmission resources in the target transmission resource does not meet the target gap requirement, or a gap between two pre-determined transmission resources or two pre-determined transmission resource bundles in the target transmission resource does not meet the target gap requirement.

The gap between two transmission resources or two transmission resource bundles not meeting the target gap requirement may also be described in this way: a gap between at least some transmission resources in the target transmission resource that is selected for one TB or MAC PDU does not meet the target gap requirement. For example, when HARQ feedback based transmission or retransmission needs to be performed on one TB or MAC PDU, at least some transmission resources in the target transmission resource that is selected for the TB or MAC PDU does not meet the target gap requirement.

In Embodiments 1 and 2 of this application, for example, that the indication information in the sidelink control signaling indicates one transmission resource in a target transmission resource includes:
in a case that a gap between two transmission resources or two transmission resource bundles in the target transmission resource does not meet a target gap requirement,
for at least part of the two transmission resources or two transmission resource bundles that do not meet the target gap requirement, indication information in the corresponding sidelink control signaling indicates one transmission resource in the target transmission resource; where
the at least part of the transmission resources or the transmission resource bundles may be the 1st transmission resource or transmission resource bundle.

For example, the SL CG includes transmission resources 1, 2, and 3, a gap between transmission resources 1 and 2 does not meet the target gap requirement, and a gap between transmission resources 2 and 3 meets the target gap requirement. In this case, the indication information in the sidelink control signaling that corresponds to transmission resource 1 indicates transmission resource 1 itself, and the indication information in the sidelink control signaling that corresponds to transmission resource 2 may indicate transmission resources 2 and 3, and the indication information in the sidelink control signaling that corresponds to transmission resource 3 indicates transmission resource 3 itself. For example, the SL CG includes transmission resources 1, 2, and 3, a gap between transmission resources 1 and 2 does not meet the target gap requirement, and a gap between transmission resources 1 and 3 also does not meet the target gap requirement. In this case, the indication information in the sidelink control signaling that corresponds to transmission resource 1 indicates transmission resource 1 itself, and the indication information in the sidelink control signaling that corresponds to transmission resource 2 indicates transmission resource 2 itself, and the indication information in the sidelink control signaling that corresponds to transmission resource 3 indicates transmission resource 3 itself.

In some embodiments, in an embodiment of this application, in a case that a gap between two transmission resources or two transmission resource bundles in the target transmission resource does not meet a target gap requirement,
for two transmission resources or two transmission resource bundles in the target transmission resource that meet the target gap requirement, resource indication information in the corresponding sidelink control signaling indicates one or more transmission resources in the target transmission resource.

In Embodiments 1 and 2 of this application, for example, that the indication information in the sidelink control signaling indicates one transmission resource in a target transmission resource includes:
in a case that a gap between two transmission resources or two transmission resource bundles in the target transmission resource does not meet a target gap requirement, and that at least one of the following conditions is met, the indication information in the sidelink control signaling indicates one transmission resource in the target transmission resource:
HARQ feedback based transmission or retransmission is to be performed;
an uplink feedback resource (for example, PUCCH and/or PUSCH) is provided;

an uplink feedback resource and a sidelink feedback resource (for example, PSFCH) are provided; and a sidelink feedback resource is provided.

The HARQ feedback based transmission or retransmission to be performed may be HARQ feedback based MAC PDU or TB transmission or retransmission.

In Embodiments 1 and 2 of this application, for example, that the indication information in the sidelink control signaling indicates one transmission resource in a target transmission resource includes one of the following (a) to (c).

(a) The resource indication information in the sidelink control signaling indicates a current transmission resource.

The resource indication information in the sidelink control signaling indicates a current transmission resource.

The current transmission resource may also be described as a transmission resource that the sidelink control signaling is located on (or schedules), or a transmission resource on which the data scheduled or indicated by the sidelink control signaling is located, or a transmission resource on which the sidelink control signaling and the data scheduled or indicated by the sidelink control signaling are located.

For example, in a case that transmission resources 1, 2, and 3 are allocated by SL DCI, during transmission, transmission resources indicated in SCI of transmission resources 1, 2, and 3 correspond to transmission resources 1, 2, and 3, respectively.

For example, in a case that one SL configured grant includes transmission resources 1, 2, and 3, during transmission, transmission resources indicated in SCI of transmission resources 1, 2, and 3 correspond to transmission resources 1, 2, and 3, respectively.

(b) The resource indication information in the sidelink control signaling indicates the 1st transmission resource in the target transmission resource.

The 1st transmission resource may also be described as the earliest transmission resource indicated by the resource indication information in the sidelink control signaling.

For example, it is the 1st transmission resource in transmission resources provided by SL DCI or the 1st transmission resource in transmission resources included in the SL configured grant.

For example, in a case that transmission resources 1, 2, and 3 are provided by SL DCI, during transmission, transmission resources indicated in SCI of transmission resources 1, 2, and 3 correspond to transmission resources 1, 1, and 1, respectively.

For example, in a case that one SL configured grant includes transmission resources 1, 2, and 3, during transmission, transmission resources indicated in SCI of transmission resources 1, 2, and 3 correspond to transmission resources 1, 1, and 1, respectively.

(c) The resource indication information in the sidelink control signaling indicates the last transmission resource in the target transmission resource.

The last transmission resource may also be described as the latest transmission resource indicated by the resource indication information in the sidelink control signaling In Embodiments 1 and 2 of this application, for example, in a case that the indication information in the sidelink control signaling indicates one transmission resource in the target transmission resource, HARQ enable/disable indication information in the sidelink control signaling corresponding to transmission resources in the target transmission resource all indicates enable or disable, and/or reservation period indication information in the sidelink control signaling indicates 0 or aperiodic transmission.

(II) Method for Determining Reservation Period Indication Information in Sidelink Control Signaling In an embodiment of this application, for example, the reservation period indication information in the sidelink control signaling indicates 0 or aperiodic transmission.

The reservation period indication information in the sidelink control signaling indicating 0 may be the reservation period indication information in the sidelink control signaling being set to 0, or indicating 0 or an index corresponding to period 0.

In some embodiments, when the sidelink resource control signaling is dynamic scheduling signaling, such as SL DCI, reservation period indication information in the SCI is set to 0 ms, or indicates 0, or indicates an index corresponding to period 0, or indicates aperiodic transmission.

In an embodiment of this application, for example, in a case that two transmission resources or two transmission resource bundles in the target transmission resource do not meet a target gap requirement, reservation period indication information in the sidelink control signaling indicates 0 or aperiodic transmission.

In an embodiment of this application, for example, in a case that a gap between two transmission resources or two transmission resource bundles in the target transmission resource does not meet the target gap requirement, and that at least one of the following conditions is met, the reservation period indication information in the sidelink control signaling indicates 0 or aperiodic transmission:

HARQ feedback based transmission or retransmission is to be performed;

an uplink feedback resource is provided;

an uplink feedback resource and a sidelink feedback resource are provided; and a sidelink feedback resource is provided.

In an embodiment of this application, for example, a reservation period indicated by the reservation period indication information in the sidelink control signaling is the same as a reservation period indicated by reservation period indication information in the sidelink resource control signaling.

The reservation period indicated by the reservation period indication information in the sidelink control signaling being the same of a reservation period indicated by reservation period indication information in the sidelink resource control signaling may be that the reservation period indicated by the reservation period indication information in the sidelink control signaling has the same value as the reservation period indicated by the reservation period indication information in the sidelink resource control signaling; In some embodiments, it may be that the reservation period indicated by the reservation period indication information in the sidelink control signaling has the same index as the reservation period indicated by the reservation period indication information in the sidelink resource control signaling.

(III) Method for Determining PSFCH Indication Information in Sidelink Control Signaling In an embodiment of this application, for example, that the indication information in the sidelink control signaling is determined based on indication information in sidelink resource control signaling includes:

PSFCH indication information is present or absent in both the sidelink control signaling and the sidelink resource control signaling;

where, for example, when the PSFCH period is one slot or no PSFCH resource is present, PSFCH indication information is absent from both the sidelink control signaling and the sidelink resource control signaling; or when the PSFCH period is two or four slots, PSFCH indication information is absent from the sidelink control signaling and the sidelink resource control signaling;

and/or the PSFCH indication information in the sidelink control signaling indicates the same number of PSFCH symbols as PSFCH indication information in the sidelink resource control signaling;

where, for example, the PSFCH indication information indicates whether the number of PSFCH symbols is 0 or 3.

In an embodiment of this application, for example, the PSFCH indication information in the sidelink control signaling is PSFCH indication information in sidelink control signaling corresponding to the 1st transmission resource in the target transmission resource or in sidelink control signaling corresponding to the 1st transmission resource that is used for actual transmission in the target transmission resource.

(IV) Method for Determining HARQ Enable/Disable Indication Information in Sidelink Control Signaling In an embodiment of this application, for example, the HARQ enable/disable indication information in the sidelink control signaling is autonomously implemented by a terminal.

In some embodiments of this application, for example, the HARQ enable/disable indication information in the sidelink control signaling indicates the same information as HARQ enable/disable indication information in the sidelink resource control signaling.

In some embodiments of this application, for example, the HARQ enable/disable indication information in the sidelink control signaling is determined according to whether two transmission resources or two transmission resource bundles in the target transmission resource meet a target gap requirement.

In an embodiment of this application, for example, that the HARQ enable/disable indication information in the sidelink control signaling is determined according to whether two transmission resources or two transmission resource bundles in the target transmission resource meet a target gap requirement includes: when two transmission resources or two transmission resource bundles in the target transmission resource meet the target gap requirement, the HARQ enable/disable indication information in the sidelink control signaling indicates enable or disable.

The HARQ enable/disable indication information indicating enable means that the HARQ enable/disable indication information indicates a value corresponding to enable or an index corresponding to enable.

The HARQ enable/disable indication information indicating disable means that the HARQ enable/disable indication information indicates a value corresponding to disable or an index corresponding to disable.

For example, the index being 1 means enable, and the index being 0 means disable.

In an embodiment of this application, for example, that the HARQ enable/disable indication information in the sidelink control signaling is determined according to whether two transmission resources or two transmission resource bundles in the target transmission resource meet a target gap requirement includes: when two transmission resources or two transmission resource bundles in the target transmission resource do not meet the target gap requirement, the HARQ enable/disable indication information in the sidelink control signaling indicates disable.

In an embodiment of this application, for example, in a case that the indication information in the sidelink control signaling indicates one transmission resource in the target transmission resource, and that two transmission resources or two transmission resource bundles in the target transmission resource do not meet the target gap requirement, HARQ enable/disable indication information in the sidelink control signaling corresponding to transmission resource in the target transmission resource all indicates disable, and/or reservation period indication information in the sidelink control signaling indicates 0 or aperiodic transmission.

In an embodiment of this application, for example, in a case that a gap between two transmission resources or two transmission resource bundles in the target transmission resource does not meet the target gap requirement, and that at least one of the following conditions is met, the HARQ enable/disable indication information in the sidelink control signaling indicates disable:

HARQ feedback based transmission or retransmission is to be performed;

an uplink feedback resource is provided;

an uplink feedback resource and a sidelink feedback resource are provided; and a sidelink feedback resource is provided.

In some embodiments of this application, for example, in a case that a gap between two transmission resources or two transmission resource bundles in the target transmission resource does not meet the target gap requirement, the indication information in the sidelink control signaling meets at least one of the following:

the indication information in the sidelink control signaling indicates one transmission resource in a target transmission resource;

the HARQ enable/disable indication information in the sidelink control signaling indicates disable; and the reservation period indication information in the sidelink control signaling indicates 0 or aperiodic transmission.

In an embodiment of this application, for example, in a case that a gap between two transmission resources or two transmission resource bundles in the target transmission resource does not meet the target gap requirement, and that at least one of the following conditions is met:

HARQ feedback based transmission or retransmission is to be performed;

an uplink feedback resource is provided;

an uplink feedback resource and a sidelink feedback resource are provided; and a sidelink feedback resource is provided.

The indication information in the sidelink control signaling meets at least one of the following:

the indication information in the sidelink control signaling indicates one transmission resource in a target transmission resource;

the HARQ enable/disable indication information in the sidelink control signaling indicates disable; and the reservation period indication information in the sidelink control signaling indicates 0 or aperiodic transmission.

In an embodiment of this application, for example, at least one of indication information in sidelink control signaling corresponding to the M-th transmission resource in the target transmission resource or indication information in sidelink control signaling corresponding to the M-th transmission resource that is used for actual transmission in the target transmission resource is identical to at least one of indication information in sidelink control signaling corresponding to the N-th transmission resource in the target transmission resource or indication information in sidelink control signaling corresponding to the N-th transmission resource that is used for actual transmission in the target transmission resource, where M is an integer greater than 1, and the N-th transmission resource or the N-th transmission resource used for actual transmission is the 1st transmission resource in the target transmission resource or a transmission resource used for initial transmission in the target transmission resource.

For example, HARQ enable/disable indication information in the indication information in the sidelink control signaling corresponding to the M-th transmission resource used for actual transmission is identical to HARQ enable/disable indication information in the indication information in the sidelink control signaling corresponding to the N-th transmission resource used for actual transmission.

In this application, a method for determining the indication information in the sidelink control signaling is defined, ensuring that RX UE, TX UE, and a control node have a consistent understanding of the SL transmission method, thus guaranteeing reliability and resource utilization of sidelink transmission and reducing scheduling errors and interference. It should be noted that the sidelink transmission method provided in embodiments of this application may be performed by a sidelink transmission apparatus or a control module for performing the sidelink transmission method in the sidelink transmission apparatus. In embodiments of this application, the sidelink transmission method being performed by a sidelink transmission apparatus is used as an example for describing the sidelink transmission apparatus provided in the embodiments of this application.

Figure 9:
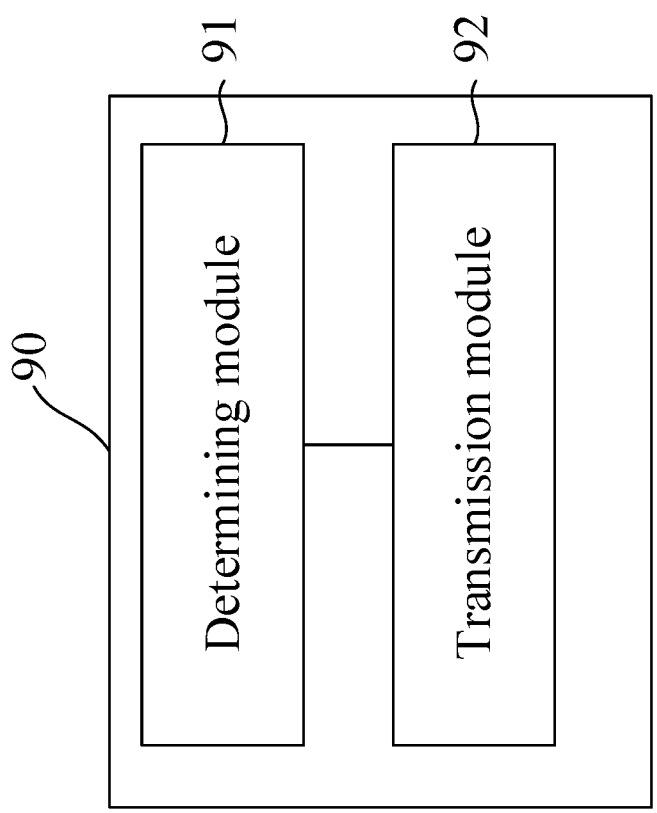
FIG. 9 is a schematic structural diagram of a sidelink transmission apparatus according to an embodiment of this application.

Refer to FIG. 9. An embodiment of this application provides a sidelink transmission apparatus 90, including:
- a determining module 91, configured to determine indication information in sidelink control signaling; and
- a transmission module 92, configured to perform transmission based on the indication information; where
- the indication information in the sidelink control signaling is determined based on indication information in sidelink resource control signaling, and/or the indication information in the sidelink control signaling indicates one transmission resource in a target transmission resource, where the target transmission resource is provided by the sidelink resource control signaling.

In some embodiments, the indication information in the sidelink control signaling includes at least one of the following:
- resource indication information;
- HARQ enable/disable indication information;
- reservation period indication information; and
- PSFCH indication information.

In some embodiments, that the indication information in the sidelink control signaling is determined based on indication information in sidelink resource control signaling includes:
- resource indication information in the sidelink control signaling indicates the same transmission resource as the resource indication information in the sidelink resource control signaling In some embodiments, when resource indication information in the sidelink control signaling indicates the same transmission resource as resource indication information in the sidelink resource control signaling, the resource indication information in the sidelink control signaling indicates a current transmission resource and a transmission resource following the current transmission resource.

In some embodiments, that the indication information in the sidelink control signaling indicates one transmission resource in a target transmission resource includes:
- in a case that two transmission resources or two transmission resource bundles in the target transmission resource do not meet a target gap requirement, the indication information in the sidelink control signaling indicates one transmission resource in the target transmission resource.

In some embodiments, that the indication information in the sidelink control signaling indicates one transmission resource in a target transmission resource includes:
- in a case that a gap between two transmission resources or two transmission resource bundles in the target transmission resource does not meet a target gap requirement,
- for at least part of the two transmission resources or two transmission resource bundles that do not meet the target gap requirement, indication information in the corresponding sidelink control signaling indicates one transmission resource in the target transmission resource.

In some embodiments, in a case that a gap between two transmission resources or two transmission resource bundles in the target transmission resource does not meet a target gap requirement,
- for two transmission resources or two transmission resource bundles in the target transmission resource that meet the target gap requirement, resource indication information in the corresponding sidelink control signaling indicates one or more transmission resources in the target transmission resource.

In some embodiments, that the indication information in the sidelink control signaling indicates one transmission resource in a target transmission resource includes:
- in a case that a gap between two transmission resources or two transmission resource bundles in the target transmission resource does not meet a target gap requirement, and that at least one of the following conditions is met, the indication information in the sidelink control signaling indicates one transmission resource in the target transmission resource:
- HARQ feedback based transmission or retransmission is to be performed;
- an uplink feedback resource is provided;
- an uplink feedback resource and a sidelink feedback resource are provided; and
- a sidelink feedback resource is provided.

In some embodiments, a total number of current transmission resources and transmission resources following the current transmission resources as indicated by the resource indication information in the sidelink control signaling does not exceed a preset threshold;
or
the total number of current transmission resources and transmission resources following the current transmission resources as indicated by the resource indication information in the sidelink control signaling does not exceed a smaller one of a first value and the preset threshold, where the first value is a total number of transmission resources inclusive of the current transmission resources and available transmission resources following the current transmission resources.

In some embodiments, that the indication information in the sidelink control signaling indicates one transmission resource in a target transmission resource includes:

the resource indication information in the sidelink control signaling indicates a current transmission resource;
or
the resource indication information in the sidelink control signaling indicates the 1st transmission resource in the target transmission resource;
or
the resource indication information in the sidelink control signaling indicates the last transmission resource in the target transmission resource.

In some embodiments, in a case that the indication information in the sidelink control signaling indicates one transmission resource in the target transmission resource, HARQ enable/disable indication information in sidelink control signaling corresponding to transmission resources in the target transmission resource all indicates enable or disable, and/or reservation period indication information in the sidelink control signaling indicates 0 or aperiodic transmission.

In some embodiments, in a case that the indication information in the sidelink control signaling indicates one transmission resource in the target transmission resource, and that two transmission resources or two transmission resource bundles in the target transmission resource do not meet the target gap requirement, HARQ enable/disable indication information in sidelink control signaling corresponding to transmission resources in the target transmission resource all indicates disable, and/or reservation period indication information in the sidelink control signaling indicates 0 or aperiodic transmission.

In some embodiments, the indication information in the sidelink control signaling includes reservation period indication information, where
the reservation period indication information in the sidelink control signaling indicates 0 or aperiodic transmission;
or
a reservation period indicated by the reservation period indication information in the sidelink control signaling is the same as a reservation period indicated by reservation period indication information in the sidelink resource control signaling.

In some embodiments, in a case that two transmission resources or two transmission resource bundles in the target transmission resource do not meet a target gap requirement, reservation period indication information in the sidelink control signaling indicates 0 or aperiodic transmission.

In some embodiments, in a case that a gap between two transmission resources or two transmission resource bundles in the target transmission resource does not meet the target gap requirement, and that at least one of the following conditions is met, the reservation period indication information in the sidelink control signaling indicates 0 or aperiodic transmission:
HARQ feedback based transmission or retransmission is to be performed;
an uplink feedback resource is provided;
an uplink feedback resource and a sidelink feedback resource are provided; and
a sidelink feedback resource is provided.

In some embodiments, the indication information in the sidelink control signaling includes PSFCH indication information, where
that the indication information in the sidelink control signaling is determined based on indication information in sidelink resource control signaling includes:
PSFCH indication information is present or absent in both the sidelink control signaling and the sidelink resource control signaling;
and/or
the PSFCH indication information in the sidelink control signaling indicates the same number of PSFCH symbols as PSFCH indication information in the sidelink resource control signaling In some embodiments, the PSFCH indication information in the sidelink control signaling is PSFCH indication information in sidelink control signaling corresponding to the 1st transmission resource in the target transmission resource or in sidelink control signaling corresponding to the 1st transmission resource that is used for actual transmission in the target transmission resource.

In some embodiments, the indication information in the sidelink control signaling includes HARQ enable/disable indication information, where
the HARQ enable/disable indication information in the sidelink control signaling indicates the same information as HARQ enable/disable indication information in the sidelink resource control signaling; or
the HARQ enable/disable indication information in the sidelink control signaling is determined according to whether two transmission resources or two transmission resource bundles in the target transmission resource meet a target gap requirement.

In some embodiments, that the HARQ enable/disable indication information in the sidelink control signaling is determined according to whether two transmission resources or two transmission resource bundles in the target transmission resource meet a target gap requirement includes:
in a case that two transmission resources or two transmission resource bundles in the target transmission resource meet the target gap requirement, the HARQ enable/disable indication information in the sidelink control signaling indicates enable or disable.

In some embodiments, that the HARQ enable/disable indication information in the sidelink control signaling is determined according to whether two transmission resources or two transmission resource bundles in the target transmission resource meet a target gap requirement includes:
in a case that two transmission resources or two transmission resource bundles in the target transmission resource do not meet the target gap requirement, the HARQ enable/disable indication information in the sidelink control signaling indicates disable.

In some embodiments, in a case that a gap between two transmission resources or two transmission resource bundles in the target transmission resource does not meet the target gap requirement, and that at least one of the following conditions is met, the HARQ enable/disable indication information in the sidelink control signaling indicates disable:
HARQ feedback based transmission or retransmission is to be performed;
an uplink feedback resource is provided;
an uplink feedback resource and a sidelink feedback resource are provided; and
a sidelink feedback resource is provided.

In some embodiments, at least one of indication information in sidelink control signaling corresponding to the M-th transmission resource in the target transmission resource or indication information in sidelink control signaling corresponding to the M-th transmission resource that is used for actual transmission in the target transmission resource is identical to at least one of indication information in sidelink control signaling corresponding to the N-th transmission resource in the target transmission resource or indication information in sidelink control signaling corresponding to the N-th transmission resource that is used for actual transmission in the target transmission resource, where M is an integer greater than 1, and the N-th transmission resource or the N-th transmission resource used for actual transmission is the 1st transmission resource in the target transmission resource or a transmission resource used for initial transmission in the target transmission resource.

In some embodiments, the sidelink control signaling includes at least one of the following:
  sidelink downlink control information;
  sidelink configured grant;
  pre-defined sidelink signal or channel In some embodiments, in the case that the indication information in the sidelink control signaling indicates one transmission resource in a target transmission resource, time domain resource indication information in the sidelink control signaling is set to 0.

In this application, a method for determining the indication information in the sidelink control signaling is defined, ensuring that RX UE, TX UE, and a control node have a consistent understanding of the SL transmission method, thus guaranteeing reliability and resource utilization of sidelink transmission and reducing scheduling errors and interference.

The sidelink transmission apparatus in the embodiments of this application may be an apparatus, or may be a component, an integrated circuit, or a chip in a terminal. The apparatus may be a mobile terminal or a non-mobile terminal. For example, the mobile terminal may include but is not limited to the types of the terminal 11 as listed above, and the non-mobile terminal may be a server, a Network Attached Storage (NAS), a Personal Computer (PC), a Television (TV), an automated teller machine, a self-service machine or the like, which are not specifically limited in the embodiments of this application.

The sidelink transmission apparatus in the embodiments of this application may be an apparatus having an operating system. The operating system may be an Android operating system, may be an iOS operating system, or may be other possible operating systems. This is not specifically limited in the embodiments of this application.

The sidelink transmission apparatus provided in the embodiments of this application can implement the processes implemented in the method embodiment in FIG. 6, with the same technical effects achieved. To avoid repetition, details are not described herein again.

Figure 10:
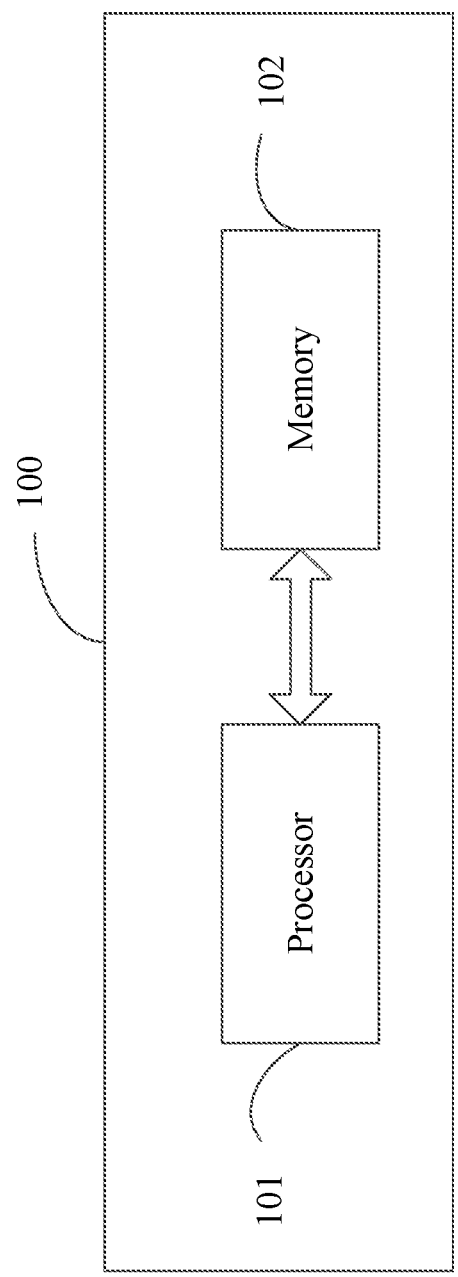
FIG. 10 is a schematic structural diagram of a terminal according to an embodiment of this application.

As shown in FIG. 10, an embodiment of this application further provides a terminal 100, including a processor 101, a memory 102, and a program or instructions stored in the memory 102 and capable of running on the processor 101, where when the program or instructions are executed by the processor 101, the processes of the foregoing sidelink transmission method embodiment are implemented, with the same technical effects achieved.

Figure 11:
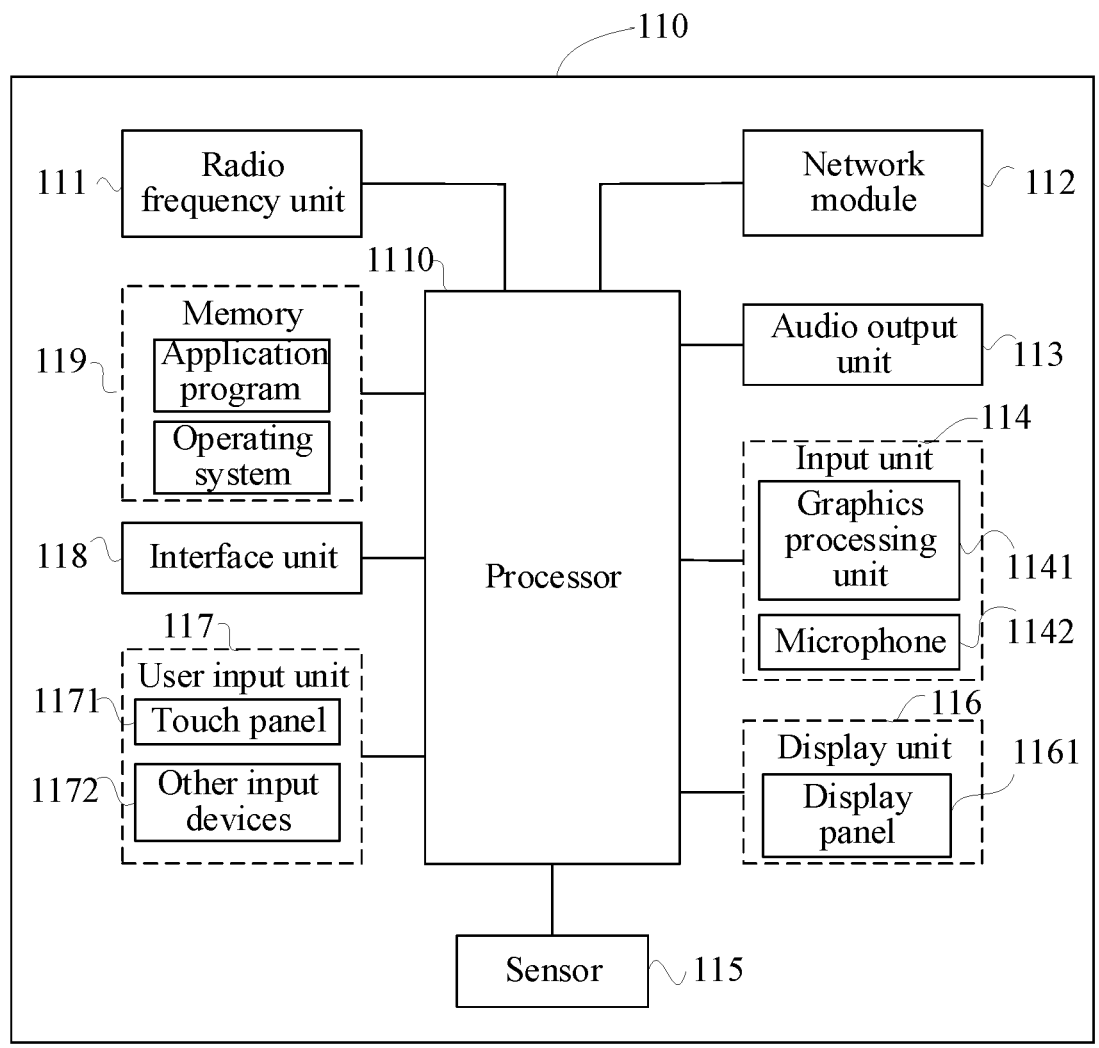
FIG. 11 is a schematic diagram of a hardware structure of a terminal according to an embodiment of this application.

FIG. 11 is a schematic diagram of a hardware structure of a terminal for implementing the embodiments of this application. The terminal 110 includes but is not limited to components such as a radio frequency unit 111, a network module 112, an audio output unit 113, an input unit 114, a sensor 115, a display unit 116, a user input unit 117, an interface unit 118, a memory 119, and a processor 1110.

It can be understood by persons skilled in the art that the terminal 110 may further include a power supply (for example, a battery) supplying power to the components. The power supply may be logically connected to the processor 1110 via a power management system, so that functions such as charge and discharge management and power consumption management are implemented via the power management system. The structure of the terminal shown in FIG. 11 does not constitute any limitation on the terminal, and the terminal may include more or fewer components than shown in the diagram, or combine some of the components, or have different arrangements of the components. Details are not described herein.

It should be understood that, in an embodiment of this application, the input unit 114 may include a Graphics Processing Unit (GPU) 1141 and a microphone 1142. The graphics processing unit 1141 processes image data of a static picture or a video that is obtained by an image capture apparatus (for example, a camera) in an image capture mode or a video capture mode. The display unit 116 may include the display panel 1161. The display panel 1161 may be configured in a form of a liquid crystal display, organic light-emitting diode, or the like. The user input unit 117 includes a touch panel 1171 and other input devices 1172. The touch panel 1171 is also referred to as a touchscreen. The touch panel 1171 may include two parts: a touch detection apparatus and a touch controller. The other input devices 1172 may include but are not limited to a physical keyboard, a function button (for example, a volume control button or a power on/off button), a trackball, a mouse, and a joystick. Details are not described herein.

In an embodiment of this application, the radio frequency unit 111 transmits downlink data received from a network-side device to the processor 1110 for processing, and in addition, transmits uplink data to the network-side device. Generally, the radio frequency unit 111 includes but is not limited to an antenna, at least one amplifier, a transceiver, a coupler, a low noise amplifier, a duplexer, and the like.

The memory 119 may be configured to store software programs or instructions and various data. The memory 119 may mainly include a program or instruction storage area and a data storage area. The program or instruction storage area may store an operating system, an application program or instructions required for at least one function (for example, a sound play function and an image play function), and the like. Further, the memory 119 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory. The memory 119 may be, for example, at least one magnetic disk storage device, flash memory, or other volatile solid-state storage device.

The processor 1110 may include one or more processing units. In some embodiments, an application processor and a modem processor may be integrated in the processor 1110. The application processor mainly processes an operating system, a user interface, an application program or instructions, and the like. The modem processor, such as a baseband processor, mainly processes wireless communication. It can be understood that the modem processor may be not integrated in the processor 1110.

The processor 1110 is configured to determine indication information in sidelink control signaling.

The radio frequency unit 111 is configured to perform transmission based on the indication information.

The indication information in the sidelink control signaling is determined based on indication information in sidelink resource control signaling, and/or the indication information in the sidelink control signaling indicates one transmission resource in a target transmission resource, where the target transmission resource is provided by the sidelink resource control signaling.

In this application, a method for determining the indication information in the sidelink control signaling is defined, ensuring that RX UE, TX UE, and a control node have a consistent understanding of the SL transmission method, thus guaranteeing reliability and resource utilization of sidelink transmission and reducing scheduling errors and interference.

In some embodiments, the indication information in the sidelink control signaling includes at least one of the following:
  resource indication information;
  HARQ enable/disable indication information;
  reservation period indication information; and
  PSFCH indication information.

In some embodiments, that the indication information in the sidelink control signaling is determined based on indication information in sidelink resource control signaling includes:
  resource indication information in the sidelink control signaling indicates the same transmission resource as the resource indication information in the sidelink resource control signaling.

In some embodiments, when resource indication information in the sidelink control signaling indicates the same transmission resource as resource indication information in the sidelink resource control signaling, the resource indication information in the sidelink control signaling indicates a current transmission resource and a transmission resource following the current transmission resource.

In some embodiments, that the indication information in the sidelink control signaling indicates one transmission resource in a target transmission resource includes:
  in a case that two transmission resources or two transmission resource bundles in the target transmission resource do not meet a target gap requirement, the indication information in the sidelink control signaling indicates one transmission resource in the target transmission resource.

In some embodiments, that the indication information in the sidelink control signaling indicates one transmission resource in a target transmission resource includes:
  in a case that a gap between two transmission resources or two transmission resource bundles in the target transmission resource does not meet a target gap requirement,
  for at least part of the two transmission resources or two transmission resource bundles that do not meet the target gap requirement, indication information in the corresponding sidelink control signaling indicates one transmission resource in the target transmission resource.

In some embodiments, in a case that a gap between two transmission resources or two transmission resource bundles in the target transmission resource does not meet a target gap requirement,
  for two transmission resources or two transmission resource bundles in the target transmission resource that meet the target gap requirement, resource indication information in the corresponding sidelink control signaling indicates one or more transmission resources in the target transmission resource.

In some embodiments, that the indication information in the sidelink control signaling indicates one transmission resource in a target transmission resource includes:
  in a case that a gap between two transmission resources or two transmission resource bundles in the target transmission resource does not meet a target gap requirement, and that at least one of the following conditions is met, the indication information in the sidelink control signaling indicates one transmission resource in the target transmission resource:
  HARQ feedback based transmission or retransmission is to be performed;
  an uplink feedback resource is provided;
  an uplink feedback resource and a sidelink feedback resource are provided; and
  a sidelink feedback resource is provided.

In some embodiments, a total number of current transmission resources and transmission resources following the current transmission resources as indicated by the resource indication information in the sidelink control signaling does not exceed a preset threshold;
  or
  the total number of current transmission resources and transmission resources following the current transmission resources as indicated by the resource indication information in the sidelink control signaling does not exceed a smaller one of a first value and the preset threshold, where the first value is a total number of transmission resources inclusive of the current transmission resources and available transmission resources following the current transmission resources.

In some embodiments, that the indication information in the sidelink control signaling indicates one transmission resource in a target transmission resource includes:
  the resource indication information in the sidelink control signaling indicates a current transmission resource;
  or
  the resource indication information in the sidelink control signaling indicates the 1st transmission resource in the target transmission resource;
  or
  the resource indication information in the sidelink control signaling indicates the last transmission resource in the target transmission resource.

In some embodiments, in a case that the indication information in the sidelink control signaling indicates one transmission resource in the target transmission resource, HARQ enable/disable indication information in sidelink control signaling corresponding to transmission resources in the target transmission resource all indicates enable or disable, and/or reservation period indication information in the sidelink control signaling indicates 0 or aperiodic transmission.

In some embodiments, in a case that the indication information in the sidelink control signaling indicates one transmission resource in the target transmission resource, and that two transmission resources or two transmission resource bundles in the target transmission resource do not meet the target gap requirement, HARQ enable/disable indication information in sidelink control signaling corresponding to transmission resources in the target transmission resource all indicates disable, and/or reservation period indication information in the sidelink control signaling indicates 0 or aperiodic transmission.

In some embodiments, the sidelink control signaling includes reservation period indication information, where the reservation period indication information in the sidelink control signaling indicates 0 or aperiodic transmission;

or a reservation period indicated by the reservation period indication information in the sidelink control signaling is the same as a reservation period indicated by reservation period indication information in the sidelink resource control signaling.

In some embodiments, in a case that two transmission resources or two transmission resource bundles in the target transmission resource do not meet a target gap requirement, reservation period indication information in the sidelink control signaling indicates 0 or aperiodic transmission.

In some embodiments, in a case that a gap between two transmission resources or two transmission resource bundles in the target transmission resource does not meet the target gap requirement, and that at least one of the following conditions is met, the reservation period indication information in the sidelink control signaling indicates 0 or aperiodic transmission:

HARQ feedback based transmission or retransmission is to be performed;

an uplink feedback resource is provided;

an uplink feedback resource and a sidelink feedback resource are provided; and a sidelink feedback resource is provided.

In some embodiments, the sidelink control signaling includes PSFCH indication information, where that the indication information in the sidelink control signaling is determined based on indication information in sidelink resource control signaling includes:

PSFCH indication information is present or absent in both the sidelink control signaling and the sidelink resource control signaling;

and/or the PSFCH indication information in the sidelink control signaling indicates the same number of PSFCH symbols as PSFCH indication information in the sidelink resource control signaling.

In some embodiments, the sidelink control signaling includes HARQ enable/disable indication information, where the PSFCH indication information in the sidelink control signaling is PSFCH indication information in sidelink control signaling corresponding to the 1st transmission resource in the target transmission resource or in sidelink control signaling corresponding to the 1st transmission resource that is used for actual transmission in the target transmission resource.

In some embodiments, the HARQ enable/disable indication information in the sidelink control signaling indicates the same information as HARQ enable/disable indication information in the sidelink resource control signaling; or the HARQ enable/disable indication information in the sidelink control signaling is determined according to whether two transmission resources or two transmission resource bundles in the target transmission resource meet a target gap requirement.

In some embodiments, that the HARQ enable/disable indication information in the sidelink control signaling is determined according to whether two transmission resources or two transmission resource bundles in the target transmission resource meet a target gap requirement includes:

in a case that two transmission resources or two transmission resource bundles in the target transmission resource meet the target gap requirement, the HARQ enable/disable indication information in the sidelink control signaling indicates enable or disable.

In some embodiments, that the HARQ enable/disable indication information in the sidelink control signaling is determined according to whether two transmission resources or two transmission resource bundles in the target transmission resource meet a target gap requirement includes:

in a case that two transmission resources or two transmission resource bundles in the target transmission resource do not meet the target gap requirement, the HARQ enable/disable indication information in the sidelink control signaling indicates disable.

In some embodiments, in a case that a gap between two transmission resources or two transmission resource bundles in the target transmission resource does not meet the target gap requirement, and that at least one of the following conditions is met, the HARQ enable/disable indication information in the sidelink control signaling indicates disable:

HARQ feedback based transmission or retransmission is to be performed;

an uplink feedback resource is provided;

an uplink feedback resource and a sidelink feedback resource are provided; and a sidelink feedback resource is provided.

In some embodiments, at least one of indication information in sidelink control signaling corresponding to the M-th transmission resource in the target transmission resource or indication information in sidelink control signaling corresponding to the M-th transmission resource that is used for actual transmission in the target transmission resource is identical to at least one of indication information in sidelink control signaling corresponding to the N-th transmission resource in the target transmission resource or indication information in sidelink control signaling corresponding to the N-th transmission resource that is used for actual transmission in the target transmission resource, where M is an integer greater than 1, and the N-th transmission resource or the N-th transmission resource used for actual transmission is the 1st transmission resource in the target transmission resource or a transmission resource used for initial transmission in the target transmission resource.

In some embodiments, the sidelink control signaling includes at least one of the following:

sidelink downlink control information;

sidelink configured grant;

pre-defined sidelink signal or channel.

In some embodiments, in the case that the indication information in the sidelink control signaling indicates one transmission resource in a target transmission resource, time domain resource indication information in the sidelink control signaling is set to 0.

An embodiment of this application further provide a readable storage medium, where the readable storage medium stores a program or instructions, and when the program or instructions are executed by a processor, the processes of the foregoing sidelink transmission method embodiments are implemented, with the same technical effects achieved. To avoid repetition, details are not described herein again.

The processor is the processor in the terminal described in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip, where the chip includes a processor and a communications interface, the communications interface is coupled to the processor, and the processor is configured to run a program or instructions on a network-side device to implement the processes of the foregoing sidelink transmission method embodiment, with the same technical effects achieved. To avoid repetition, details are not described herein again.

It should be understood that the chip in the embodiments of this application may also be referred to as a system-level chip, a system chip, a chip system, a system on chip, or the like.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more Application Specific Integrated Circuits (ASICs), Digital Signal Processors (DSP), DSP Devices (DSPDs), Programmable Logic Devices (PLDs), Field-Programmable Gate Arrays (FPGAs), general-purpose processors, controllers, microcontrollers, microprocessors, and other electronic units for performing the functions described in this application, or a combination thereof.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in addition to a necessary universal hardware platform or by hardware only. In some embodiments, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to these embodiments. The embodiments are merely illustrative rather than restrictive. Inspired by this application, persons of ordinary skill in the art may develop many other forms without departing from the principle of this application and the protection scope of the claims, and all such forms fall within the protection scope of this application.

What is claimed is:

1. A sidelink transmission method, performed by a terminal, comprising:
   determining indication information in sidelink control signaling; and
   performing transmission based on the indication information, wherein
   the indication information in the sidelink control signaling is determined based on indication information in sidelink resource control signaling, or the indication information in the sidelink control signaling indicates one transmission resource in a target transmission resource, wherein the target transmission resource is provided by the sidelink resource control signaling,
   wherein when the indication information in the sidelink control signaling indicates one transmission resource in a target transmission resource, time domain resource indication information in the sidelink control signaling is set to 0.

2. The sidelink transmission method according to claim 1, wherein the indication information in the sidelink control signaling comprises at least one of the following:
   resource indication information;
   Hybrid Automatic Repeat Request (HARQ) enable/disable indication information;
   reservation period indication information; or
   Physical Sidelink Feedback Channel (PSFCH) indication information.

3. The sidelink transmission method according to claim 2, wherein that the indication information in the sidelink control signaling is determined based on the indication information in sidelink resource control signaling comprises:
   resource indication information in the sidelink control signaling indicating the same transmission resource as the resource indication information in the sidelink resource control signaling.

4. The sidelink transmission method according to claim 2, wherein
   the resource indication information in the sidelink control signaling indicates a current transmission resource and a transmission resource following the current transmission resource.

5. The sidelink transmission method according to claim 4, wherein
   a total number of current transmission resources and transmission resources following the current transmission resources as indicated by the resource indication information in the sidelink control signaling does not exceed a preset threshold;
   or
   the total number of current transmission resources and transmission resources following the current transmission resources as indicated by the resource indication information in the sidelink control signaling does not exceed a smaller one of a first value and the preset threshold, wherein the first value is a total number of transmission resources inclusive of the current transmission resources and available transmission resources following the current transmission resources.

6. The sidelink transmission method according to claim 1, wherein the sidelink resource control signaling is sidelink downlink control information or sidelink configured grant.

7. The sidelink transmission method according to claim 1, wherein the indication information in the sidelink control signaling indicating one transmission resource in a target transmission resource comprises:

resource indication information in the sidelink control signaling indicating a current transmission resource;
or
the resource indication information in the sidelink control signaling indicating the 1st transmission resource in the target transmission resource;
or
the resource indication information in the sidelink control signaling indicating the last transmission resource in the target transmission resource.

8. The sidelink transmission method according to claim 1, wherein the indication information in the sidelink control signaling comprises reservation period indication information, wherein
the reservation period indication information in the sidelink control signaling indicates 0 or aperiodic transmission;
or
a reservation period indicated by the reservation period indication information in the sidelink control signaling is the same as a reservation period indicated by reservation period indication information in the sidelink resource control signaling.

9. The sidelink transmission method according to claim 8, wherein:
the sidelink control signaling is Sidelink Control Information (SCI), or
that the reservation period indication information in the sidelink control signaling indicates 0 comprises:
the reservation period indication information in the sidelink control signaling indicates 0 ms, or
the reservation period indication information in the sidelink control signaling indicates an index corresponding to period 0.

10. The sidelink transmission method according to claim 1, wherein that the indication information in the sidelink control signaling indicates one transmission resource in a target transmission resource comprises:
when two transmission resources or two transmission resource bundles in the target transmission resource do not meet a target gap requirement, the indication information in the sidelink control signaling indicating one transmission resource in the target transmission resource.

11. The sidelink transmission method according to claim 1, wherein that the indication information in the sidelink control signaling indicates one transmission resource in a target transmission resource comprises:
when a gap between two transmission resources or two transmission resource bundles in the target transmission resource does not meet a target gap requirement, for at least part of the two transmission resources or two transmission resource bundles that do not meet the target gap requirement, indication information in the corresponding sidelink control signaling indicating one transmission resource in the target transmission resource.

12. The sidelink transmission method according to claim 1, wherein
when a gap between two transmission resources or two transmission resource bundles in the target transmission resource does not meet a target gap requirement, for two transmission resources or two transmission resource bundles in the target transmission resource that meet the target gap requirement, resource indication information in the corresponding sidelink control signaling indicating one or more transmission resources in the target transmission resource.

13. The sidelink transmission method according to claim 1, wherein that the indication information in the sidelink control signaling indicates one transmission resource in a target transmission resource comprises:
when a gap between two transmission resources or two transmission resource bundles in the target transmission resource does not meet a target gap requirement, and that at least one of the following conditions is met, the indication information in the sidelink control signaling indicating one transmission resource in the target transmission resource:
Hybrid Automatic Repeat Request (HARQ) feedback based transmission or retransmission being to be performed;
an uplink feedback resource being provided;
an uplink feedback resource and a sidelink feedback resource being provided; or
a sidelink feedback resource being provided.

14. The sidelink transmission method according to claim 1, wherein
when the indication information in the sidelink control signaling indicates one transmission resource in the target transmission resource, Hybrid Automatic Repeat Request (HARQ) enable/disable indication information in sidelink control signaling corresponding to transmission resources in the target transmission resource all indicates enable or disable, or reservation period indication information in the sidelink control signaling indicates 0 or aperiodic transmission; or
when the indication information in the sidelink control signaling indicates one transmission resource in the target transmission resource, and that two transmission resources or two transmission resource bundles in the target transmission resource do not meet the target gap requirement, HARQ enable/disable indication information in sidelink control signaling corresponding to transmission resources in the target transmission resource all indicates disable, or reservation period indication information in the sidelink control signaling indicates 0 or aperiodic transmission.

15. The sidelink transmission method according to claim 1, wherein
when two transmission resources or two transmission resource bundles in the target transmission resource do not meet a target gap requirement, reservation period indication information in the sidelink control signaling indicates 0 or aperiodic transmission;
or,
when a gap between two transmission resources or two transmission resource bundles in the target transmission resource does not meet the target gap requirement, and that at least one of the following conditions is met, the reservation period indication information in the sidelink control signaling indicates 0 or aperiodic transmission:
Hybrid Automatic Repeat Request (HARQ) feedback based transmission or retransmission being to be performed;
an uplink feedback resource being provided;
an uplink feedback resource and a sidelink feedback resource being provided; or
a sidelink feedback resource being provided.

16. The sidelink transmission method according to claim 1, wherein the indication information in the sidelink control signaling comprises Physical Sidelink Feedback Channel (PSFCH) indication information, wherein that the indication information in the sidelink control signaling is determined based on indication information in sidelink resource control signaling comprises:

PSFCH indication information being present or absent in both the sidelink control signaling and the sidelink resource control signaling;

or the PSFCH indication information in the sidelink control signaling indicating the same number of PSFCH symbols as PSFCH indication information in the sidelink resource control signaling, wherein the PSFCH indication information in the sidelink control signaling is PSFCH indication information in sidelink control signaling corresponding to the 1st transmission resource in the target transmission resource or in sidelink control signaling corresponding to the 1st transmission resource that is used for actual transmission in the target transmission resource.

17. The sidelink transmission method according to claim 1, wherein the indication information in the sidelink control signaling comprises Hybrid Automatic Repeat Request (HARQ) enable/disable indication information, wherein the HARQ enable/disable indication information in the sidelink control signaling indicates the same information as HARQ enable/disable indication information in the sidelink resource control signaling; or the HARQ enable/disable indication information in the sidelink control signaling is determined according to whether two transmission resources or two transmission resource bundles in the target transmission resource meet a target gap requirement.

18. The sidelink transmission method according to claim 1, wherein at least one of indication information in sidelink control signaling corresponding to the M-th transmission resource in the target transmission resource or indication information in sidelink control signaling corresponding to the M-th transmission resource that is used for actual transmission in the target transmission resource is identical to at least one of indication information in sidelink control signaling corresponding to the N-th transmission resource in the target transmission resource or indication information in sidelink control signaling corresponding to the N-th transmission resource that is used for actual transmission in the target transmission resource, wherein M is an integer greater than 1, and the N-th transmission resource or the N-th transmission resource used for actual transmission is the 1st transmission resource in the target transmission resource or a transmission resource used for initial transmission in the target transmission resource.

19. The sidelink transmission method according to claim 1, wherein the sidelink resource control signaling comprises at least one of the following:

sidelink downlink control information;
sidelink configured grant;
Media Access Control Control Element (MAC CE);
Radio Resource Control (RRC) signaling; or
pre-defined sidelink signal or channel.

20. A terminal, comprising a processor; and a memory having a computer program or instructions stored thereon, wherein the computer program or the instructions, when executed by the processor, cause the processor to perform a sidelink transmission method, comprising:

determining indication information in sidelink control signaling; and performing transmission based on the indication information, wherein the indication information in the sidelink control signaling is determined based on indication information in sidelink resource control signaling, or the indication information in the sidelink control signaling indicates one transmission resource in a target transmission resource, wherein the target transmission resource is provided by the sidelink resource control signaling, wherein when the indication information in the sidelink control signaling indicates one transmission resource in a target transmission resource, time domain resource indication information in the sidelink control signaling is set to 0.

* * * * *